(12) United States Patent
Sasaki

(10) Patent No.: US 9,183,388 B2
(45) Date of Patent: Nov. 10, 2015

(54) INJUSTICE DETECTING SYSTEM, INJUSTICE DETECTING DEVICE AND INJUSTICE DETECTING METHOD

(75) Inventor: Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 14/117,215

(22) PCT Filed: Apr. 27, 2012

(86) PCT No.: PCT/JP2012/061799
§ 371 (c)(1),
(2), (4) Date: Nov. 12, 2013

(87) PCT Pub. No.: WO2012/153746
PCT Pub. Date: Nov. 15, 2012

(65) Prior Publication Data
US 2014/0208439 A1    Jul. 24, 2014

(30) Foreign Application Priority Data
May 12, 2011    (JP) .................. 2011-107300

(51) Int. Cl.
*G06F 17/30* (2006.01)
*G06F 21/55* (2013.01)
(Continued)

(52) U.S. Cl.
CPC .............. *G06F 21/554* (2013.01); *G06F 21/00* (2013.01); *G06F 21/316* (2013.01); *G06F 21/552* (2013.01); *G06F 11/3476* (2013.01)

(58) Field of Classification Search
CPC ... G06F 21/554; G06F 21/316; G06F 21/552; G06F 21/00; G06F 11/3072; G06F 2221/2153; G06F 21/32; G06F 21/34; G06F 21/6245; G06F 21/10; G06F 2221/0735; G06F 2221/2115; G06F 21/31; G06F 21/608; G06F 21/6254; G06F 21/84; G06F 2211/008
USPC .......................................................... 726/28
See application file for complete search history.

(56) References Cited

U.S. PATENT DOCUMENTS 7,099,866 B1    8/2006 Crosbie et al.
2002/0046275 A1    4/2002 Crosbie et al.
(Continued)

FOREIGN PATENT DOCUMENTS

JP    2005-332345    12/2005
JP    2006-243947    9/2006
(Continued)

OTHER PUBLICATIONS

Extended European Search Report issued by the European Patent Office for European Application No. 12782806.9 dated Oct. 1, 2014 (8 pgs.).
(Continued)

Primary Examiner — Dant Shaifer Harriman
Assistant Examiner — Abiy Getachew
(74) Attorney, Agent, or Firm — Wilmer Cutler Pickering Hale and Dorr LLP

(57) ABSTRACT

The present invention provides an injustice detecting system enabling detection of an injustice that is performed through an operation that cannot be distinguished from normal operation. This injustice detecting system is provided with: a history recording unit for recording operation history information of a monitored device; an audit information disclosure unit for disclosing audit information including at least information indicating that an audit for detecting an injustice is to be implemented; and an injustice detecting unit for detecting the injustice on the basis of pre-disclosure operation history information which is operation history information generated before the audit information is disclosed, and post-disclosure operation history information, which is operation history information generated after the audit information is disclosed.

15 Claims, 11 Drawing Sheets

(51) Int. Cl.
*G06F 21/00* (2013.01)
*G06F 21/31* (2013.01)
*G06F 11/34* (2006.01)

(56) References Cited

U.S. PATENT DOCUMENTS

2008/0271143 A1   10/2008  Stephens et al.
2009/0048856 A1*  2/2009   Howell et al. ................... 705/1
2011/0202372 A1*  8/2011   Folsom .............................. 705/4

FOREIGN PATENT DOCUMENTS

| JP | 2008-181231 | 8/2008 |
| JP | 2008-192091 | 8/2008 |
| JP | 2010-211257 | 9/2010 |
| JP | 2010-250502 | 11/2010 |

OTHER PUBLICATIONS

Roschke, et al., "Intrusion Detection in the Cloud," 2009 Eighth IEEE International Conference on Dependable, Autonomic and Secure Computing, Chengdu, China, pp. 729-734 (Dec. 12-14, 2009).
International Search Report corresponding to PCT/JP2012/061799, dated Jun. 21, 2012, 4 pages.
Written Opinion of the International Search Authority corresponding to PCT/JP2012/061799, dated Jul. 3, 2012, 10 pages.

* cited by examiner

Fig.2

| 132 OPERATION CONTENTS | 133 OPERATION TIME | 134 DELETION METHOD CLASSIFICATION | 135 DELETED FILE GENERATION TIME | 136 DELETED FILE NAME | 137 DELETED FILE CONTENTS |
|---|---|---|---|---|---|
| DELETE FILE | 2/1 8:50 | MOVE TO TRASH BOX | 2010/1/20 | abc.txt | N/A |
| DELETE FILE | 2/1 9:10 | ERASE | 2010/1/21 | def.gif | ... |

131 OPERATION HISTORY INFORMATION

141 DELETION NUMBER LIST

142 NORMAL DELETION NUMBER

Fig.7

331 OPERATION HISTORY INFORMATION

| 132 OPERATION CONTENTS | 133 OPERATION TIME | 334 ADDRESS | 337 COMMUNICATION DATA CONTENTS |
|---|---|---|---|
| RECEIVE MAIL | 2/1 8:50 | abcd@bcd | ... |
| SEND MAIL | 2/1 8:55 | efg@bcd | ... |
| BROWSE WEB | 2/1 9:10 | http://cde.com | N/A |

INJUSTICE DETECTING SYSTEM, INJUSTICE DETECTING DEVICE AND INJUSTICE DETECTING METHOD

CROSS-REFERENCE TO RELATED APPLICATIONS

This application is a national stage application of International Application No. PCT/JP2012/061799 entitled "Injustice Detecting System, Injustice Detecting Device and Injustice Detecting Method," filed on Apr. 27, 2012, which claims the benefit of the priority of Japanese patent application No. 2011-107300, filed on May 12, 2011, the disclosures of each of which are hereby incorporated by reference in their entirety.

TECHNICAL FIELD

The present invention relates to an injustice detecting system, an injustice detecting device and an injustice detecting method.

BACKGROUND ART

With respect to detecting an injustice access to an information system which is carried out by a handler who has an access right, various related techniques are known. Here, the handler includes a person, a computer or another apparatus. Hereinafter, the handler is called a person having access right.

A patent document 1 discloses a log analyzing server which detects a specific user, who carries out a peculiar operation, in a group including a plurality of users in comparison with another user in the group.

The log analyzing server operates as follows.

First, the log analyzing server collects a log of a computer operation or the like carried out by users belonging to the same group.

Next, the log analyzing server generates a model of operation, which a specific user who belongs to the group carries out as a specific time elapses, on the basis of a log of the operation carried out by the specific user. At the same time, the log analyzing server generates models of operations, which a plurality of general users carry out as the specific time (same as the specific time corresponding the model of operation carried out by the specific use) elapse, on the basis of logs of the operations carried out by a plurality of the general users. Here, the general users are different from the specific user who belongs to the group, but belongs to the same group.

Next, the log analyzing server carries out analysis by comparing a general tendency of the models of operations carried out by the general users, and the model of operation carried out by the specific users.

The log analyzing server, which is disclosed in the patent document 1, operates as mentioned above, and consequently detects the specific user, who carries out the peculiar operation in the group, in comparison with the general user.

A patent document 2 discloses an abnormal operation detecting device which detects an abnormal operation on the basis of a regular operation which can be judged to be an usual operation, and a current operation.

The abnormal operation detecting device includes a log collecting means, a current operation defining means, a regular operation database and an operation comparing means.

The log collecting means acquires operation contents of a user terminal.

The current operation defining means defines operation contents, which the log collecting means acquires and which are carried out during a short time in a specific user terminal, as the current operation.

The regular operation database stores contents corresponding to the regular operation, which can be judged to be the usual operation, in advance.

The operation comparing means finds a ratio of number of the regular operations to number of the current operations, which are different from the regular operation, as a degree of abnormal operation, and judges that the current operation is abnormal if the degree of abnormal operation is larger than a predetermined threshold value.

The abnormal operation detecting device disclosed in the patent document 2 detects the current operation, which is abnormal in comparison with the regular operations, by having the above-mentioned configuration.

Patent Document

[Patent document 1] Japanese Patent Application Laid-Open No. 2008-192091
[Patent document 2] Japanese Patent Application Laid-Open No. 2010-250502

SUMMARY OF THE INVENTION

Problem to be Solved by the Invention

However, the technique which is disclosed in the patent document mentioned above, has a problem that it is impossible to detect an injustice carried out by an operation which can not be distinguished from a normal operation.

A reason why there is a case that the injustice can not be detected will be described in the following.

In the case that the injustice is carried out by an operation corresponding to regular operations, the log analyzing server described in the patent document 1 can not detect the injustice. Specifically, in the case that a specific user carries out the injustice by carrying out an operation which is similar to the operations carried out by a plurality of the general users who belong to the same group, the log analyzing server can not detect the injustice.

Moreover, the log analyzing server can not be applied to a transaction system which can not define a group whose members carry out the same operation at the same time. Specifically, in the case of, for example, a sales department of a general company, each member of the sales department carries out a job according to a situation of a customer of each member. Accordingly, operations which are carried out to an information system by the members do not synchronize. That is, the log analyzing server can be applied to only the case that a transaction system using an information system, which is an object for analysis, is corresponding to a transaction system which can define the group whose members carry out the same operation at the same time.

In the case that the injustice is carried out by an operation corresponding to the regular operation, the abnormal operation detecting device disclosed in the patent document 2 can not detect the injustice. Specifically, in the case that the injustice is carried out by a specific operation, the abnormal operation detecting device can not detect the injustice. Here, the specific operation means an operation whose operation contents exist in a range where the operation contents are not used by the abnormal operation detecting device when comparing a difference between the current operation and the regular operation.

An object of the present invention is to provide an injustice detecting system, an injustice detecting device and an injustice detecting method which solve the problem mentioned above.

Means for Solving a Problem

An injustice detecting system, according to a first aspect of the present invention includes:

a history storing means for storing operation history information of a monitored device;

an audit information disclosing means for disclosing audit information including at least information which indicates that an audit for detecting an injustice; and an injustice detecting means for detecting an injustice on the basis of pre-disclosure operation history information corresponding to said operation history information before a time when said audit information is disclosed, and post-disclosure operation history information corresponding to said operation history information after the time when said audit information is disclosed.

An injustice detecting device, according to a second aspect of the present invention includes:

a history storing means for storing operation history information of a monitored device;

an audit information disclosing means for disclosing audit information including at least information which indicates that an audit for detecting an injustice; and an injustice detecting means for detecting an injustice on the basis of pre-disclosure operation history information corresponding to said operation history information before a time when said audit information is disclosed, and post-disclosure operation history information corresponding to said operation history information after the time when said audit information is disclosed.

An injustice detecting method which an injustice detecting device executes, according to a fourth aspect of the present invention, includes:

storing operation history information of a monitored device;

disclosing audit information including at least information which indicates that an audit for detecting an injustice; and detecting an injustice on the basis on pre-disclosure operation history information corresponding to said operation history information before a time when said audit information is disclosed, and post-disclosure operation history information corresponding to said operation history information after the time when said audit information is disclosed.

A non-transitory medium according to a fourth aspect of the present invention records a program which makes a computer, which includes a means to store operation history information of a monitored device, execute:

a process of disclosing audit information including at least information which indicates that an audit for detecting an injustice; and a process of detecting an injustice on the basis on pre-disclosure operation history information corresponding to said operation history information before a time when said audit information is disclosed, and post-disclosure operation history information corresponding to said operation history information after the time when said audit information is disclosed.

Effect of the Invention

The present invention has an effect that it is possible to detect the injustice carried out by the operation which can not be distinguished from the normal operation.

BRIEF DESCRIPTION OF THE DRAWINGS

FIG. 2 is a diagram showing an example of operation history information in the first exemplary embodiment of the present invention.

FIG. 7 is a diagram showing an example of operation history information in a third exemplary embodiment of the present invention.

EXEMPLARY EMBODIMENTS FOR CARRYING OUT OF THE INVENTION

Next, an exemplary embodiment of the present invention will be described in detail with reference to a drawing.

First Exemplary Embodiment

Figure 1:
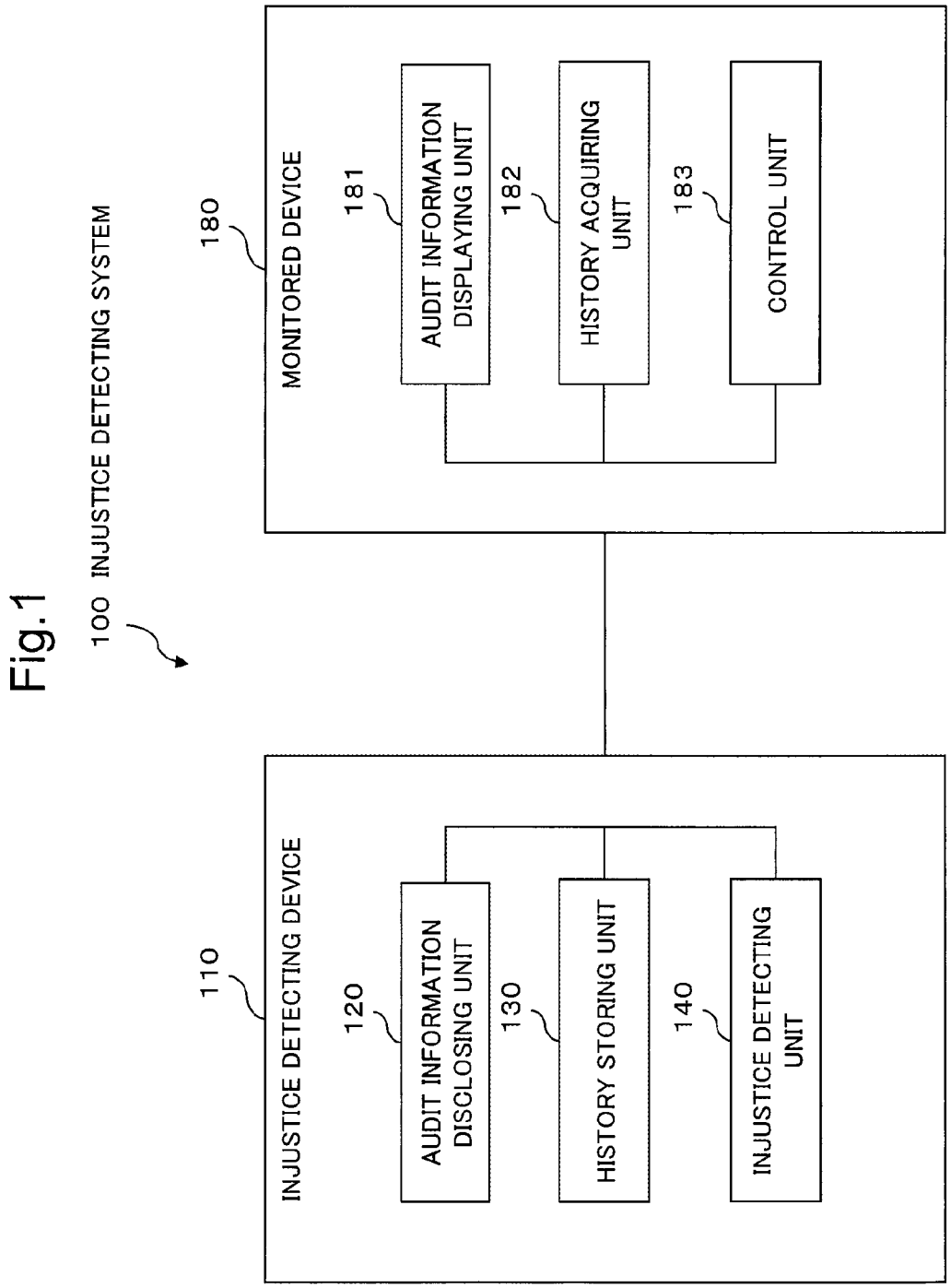
FIG. 1 is a block diagram showing a configuration according to a first exemplary embodiment of the present invention.

FIG. 1 is a block diagram showing a configuration of an injustice detecting system according to a first exemplary embodiment of the present invention.

Referring to FIG. 1, an injustice detecting system 100 according to the exemplary embodiment includes an injustice detecting device 110 and a monitored device 180.

The injustice detecting device 110 includes an audit information disclosing unit 120, a history storing unit 130 and an injustice detecting unit 140. The injustice detecting device 110 may be, for example, a server, PC, a terminal or another information processing device.

The monitored device 180 includes an audit information displaying unit 181, a history acquiring unit 182 and a control unit 183. The monitored device 180 may be, for example, a server, PC, a terminal or another information processing device.

The audit information disclosing unit 120 of the injustice detecting device 110 discloses audit information which includes at least audit execution information. Here, the audit execution information means information which indicates that an audit for detecting the injustice is executed. For example, the audit information disclosing unit 120 discloses the audit information by sending the audit information to the monitored device 180.

Moreover, the audit information disclosing unit 120 outputs a time (hereinafter, referred to as audit information disclosure time), at which the audit information is disclosed, to the injustice detecting unit 140 at a time when making the injustice detecting unit 140 start working. Here, the time when making the injustice detecting unit 140 start working means a time when a predetermined predicted period of time elapses since the audit information is disclosed. Moreover, the predetermined predicted period of time means a period of time which is given in advance by, for example, a means not shown in the figure, and which indicates that it is predicted that an injustice concealing operation will be carried out when the prediction period of time elapses. Here, the injustice concealing operation means an operation in which the injustice is concealed by a trigger which is post-disclosure audit information being disclosed.

Moreover, the audit information disclosing unit 120 may output, for example, the time of disclosing the audit information to the injustice detecting unit 140 in advance. In this case, the injustice detecting unit 140 may start working at a time when the predetermined predicted period of time mentioned above elapses since the received time of disclosing the audit information.

The history storing unit 130 stores operation history information which the history acquiring unit 182 of the monitored device 180 acquires.

FIG. 2 is a diagram showing an example of operation history information 131. Referring to FIG. 2, the operation history information 131 includes at least operation contents 132, an operation time 133, a deletion method classification 134, a deleted file generation time 135, a deleted file name 136 and deleted file contents 137.

The operation history information 131 whose operation contents 132 is 'delete file' is also called file deletion history information.

The operation contents 132 means information which indicates contents of an operation carried out by an handler of the monitored device 180. Specifically, the operation contents 132 indicate, for example, 'delete file' which means an operation of deleting a file. The operation contents 132 may indicate 'send mail' meaning an operation in which the monitored device 180 sends an e-mail. The operation contents 132 may indicate 'receive mail' meaning an operation in which the monitored device 180 receives an e-mail. Furthermore, the operation contents 132 may indicate 'browse web (browse web page)' meaning an operation in which the monitored 180 accesses the Internet.

Here, the file is, for example, a text file, a document file, a numerical value data file, a database data file, an image data file, a voice data file, an e-mail data file, a binary file like a program, and another data file.

The operation time 133 means information which indicates a time when an operation indicated in the operating contents 132 is carried out. The operation time 133 indicates a date and time, for example, like 'month/date hour:minute'.

The deletion method classification 134 indicates, for example, 'move to trash box' meaning to move a file to a folder, which is named a trash box, by carrying out an operation of deleting the file, or 'erase file' which means erasing a file from a storage means (not shown in the figure) of the monitored device by carrying out an operation of erasing the file. Here, for example, also in the case that the file in the trash box is erased by carrying out an operation of clearing the trash box, the deletion method classification 134 indicates 'erase file'.

The deleted file generation time 135 means information which indicates a time when a file deleted by the operation of deleting the file is generated first.

The deleted file name 136 means a file name of the file which is deleted by the operation of deleting the file.

The deleted file contents 137 means contents of the file which is deleted by the operation of deleting the file. The deleted file contents 137 may include all of or a part of the contents of the file. Here, N/A described in the figure is an abbreviation of 'not available', and indicates 'impossible to be used'. That is, a case that the deleted file contents 137 indicates N/A indicates that the deleted file contents 137 do not include contents of the file.

The injustice detecting unit 140 detects the injustice on the basis of pre-disclosure operation history information and post-disclosure operation history information. Here, the pre-disclosure operation history information means the operation history information 131 which is stored in the history storing unit 130 before the audit information is disclosed. Moreover, the post-disclosure operation history information means the operation history information 131 which is stored in the history storing unit 130 after the audit information is disclosed. Here, specifically, the injustice detecting unit 140 according to the exemplary embodiment detects the injustice as a result of detecting the injustice concealing operation. Next, in the case that the injustice detecting unit 140 detects the injustice (injustice concealing operation), the injustice detecting unit 140 outputs information, which is corresponding to the detected injustice concealing operation, to an outside by use of a means not shown in the figure. Here, the information corresponding to the detected injustice concealing operation means information related to the injustice.

The injustice detecting unit 140 starts working by a trigger which is the audit information disclosure time being received from the audit information disclosing unit 120. Here, the injustice detecting unit 140 may start working after the predetermined predicted time mentioned above elapses since receiving the audit information disclosure time from the audit information disclosing unit 120.

Next, a specific example of the operation of the injustice detecting unit 140 will be described.

<<<First Specific Example of Injustice Detecting Unit>>>

For example, the injustice detecting unit 140 detects an injustice concealing operation on the basis of number of pieces of file deletion history information which are included in each of pre-disclosure operation history information and post-disclosure operation history information.

As a more specific example, the injustice detecting unit 140 counts number of the pieces of the file deletion history information, which are included in the pre-disclosure history information, per a predetermined unit time (for example, one day). Hereinafter, 'the number of the pieces of the file deletion history information, which are included in the pre-disclosure operation history information, per the predetermined unit time' is referred to as an usual deletion number. At the same time, the injustice detecting unit 140 counts number of the pieces of the file deletion history information, which are included in the post-disclosure history information, per an unit time. Hereinafter, 'the number of the pieces of the file deletion history information, which are included in the post-disclosure operation history information, per the predetermined unit time' is referred to as a checked deletion number.

Next, the injustice detecting unit 140 makes the usual deletion number, which is larger than 1, approximate to the normal distribution, and calculates a T-score of the checked deletion number according to the normal distribution.

Next, the injustice detecting unit 140 makes the usual deletion number, which is larger than 1, approximate to the normal distribution, and calculates a T-score (or a Z-score) of the checked deletion number according to the normal distribution. Here, each of a T-score and a Z-score is calculated from standard scores.

In this case, the operation history information may include only the operation contents 132 and the operation time 133 out of the operation history information 131.

<<<Second Specific Example of Injustice Detecting Unit>>>

Moreover, for example, the audit information disclosing unit 120 of the injustice detecting device 110 may disclose audit information including at least scheduled time information, which indicates a scheduled time for executing the audit, in addition to audit execution information.

In this case, according to the first specific example mentioned above, for example, the injustice detecting unit 140 may count number of the pieces of file deletion history information, which are included in post-disclosure pre-execution operation history information, per an unit time as checked deletion number. Here, the post-disclosure pre-execution operation history information means the operation history information 131 whose operation time 133 indicates any time in a period of time from the time of disclosing the audit information until the time indicated by the scheduled time information.

<<<Third Specific Example of Injustice Detecting Unit>>>

Moreover, for example, the injustice detecting unit 140 may detect injustice concealing operations on the basis of the deletion method which is indicated by file deletion history information included in post-disclosure operation history information.

As a more specific example, the injustice detecting unit 140 calculates a ratio of the number of the pieces of the file deletion history information, whose deletion method classification 134 indicates 'erase file', to the number of the pieces of the file deletion history information included in the post-disclosure operation history information. Next, the injustice detecting unit 140 detects the injustice concealing operation on the basis of a judgment whether the calculated ratio is larger than a predetermined value (for example, 50 percent) or not.

In this case, the operation history information may include only the operation contents 132, the operation time 133 and the deletion method classification 134 out of the operation history information 131.

<<<Fourth Specific Example of Injustice Detecting Unit>>>

Moreover, for example, the injustice detecting unit 140 may detect injustice concealing operations on the basis of date and time at which a deletion object file is generated and which is indicated by file deletion history information included in post-disclosure operation history information.

As a more specific example, the injustice detecting unit 140 calculates a ratio of number of the pieces of the file deletion history information, whose deleted file generation time 135 indicates before a predetermined time, out of the file deletion history information included in the post-disclosure operation history information. Here, the predetermined time is, for example, one year before the current time. But, the predetermined time may be any time.

Next, the injustice detecting unit 140 may detect the injustice concealing operation on the basis of a judgment whether the calculated ratio is larger than a predetermined value (for example, 50 percent) or not.

In this case, the operation history information may include only the operation contents 132, the operation time 133 and the deleted file generation time 135 out of the operation history information 131.

<<<Fifth Specific Example of Injustice Detecting Unit>>>

Moreover, for example, the injustice detecting unit 140 may detect injustice concealing operations on the basis of file deletion history information included in post-disclosure operation history information of the plural monitored devices 180.

As a more specific example, the injustice detecting unit 140 counts a usual deletion number on the basis of the pre-disclosure operation history information of each monitored device 180 out of the plural monitored device 180. Next, the injustice detecting unit 140 adds the usual deletion number, which is counted per the monitored device 180, to find a total of the usual deletion numbers.

At the same time, the injustice detecting unit 140 counts a checked deletion number on the basis of the post-disclosure operation history information of each monitored device 180 out of the plural monitored devices 180. Next, the injustice detecting unit 140 adds the checked deletion number of each monitored device 180 to find a total of the checked deletion numbers.

Next, the injustice detecting unit 140 calculates a T-score of the total of the checked deletion numbers according to the normal distribution which is generated from the total of the usual deletion numbers.

Next, the injustice detecting unit 140 detects the injustice concealing operation on the basis of a judgment whether the calculated T-score of the total of the checked deletion numbers is larger than a predetermined value (for example, 70) or not.

In this case, the operation history information may include only the operation contents 132 and the operation time 133 out of the operation history information 131.

<<<Sixth Specific Example of Injustice Detecting Unit>>>

Moreover, for example, the injustice detecting unit 140 may detect injustice concealing operation on the basis of, in particular, the deleted file name 136 of file deletion history information included in post-disclosure operation history information of the plural monitored devices 180.

As a more specific example, the injustice detecting unit 140 extracts the file deletion history information, which includes the same deleted file name 136, out of the post-disclosure operation history information of the plural monitored devices 180.

Next, the injustice detecting unit 140 counts number of kinds of the deleted file name 136 which are included in the extracted file deletion history information. Hereinafter, the number of the kinds of the deleted file name 136, which is included in the extracted file deletion history information, is called number of kinds of cooperative deletion.

Next, the injustice detecting unit 140 may detect the injustice concealing operation on the basis of a judgment whether the counted number of kinds of cooperative deletion is larger than a predetermined value (for example, 1) or not.

In this case, the operation history information may include only the operation contents 132, the operation time 133 and the deleted file name 136 out of the operation history information 131.

<<<Seventh Specific Example of Injustice Detecting Unit>>>

Moreover, for example, the injustice detecting unit 140 may detect the injustice concealing operation by combining any specific examples out of the first to the sixth specific examples.

As a more specific example, the following may be used by combining the first specific example and the third specific example. The injustice detecting unit element 140 counts number of the pieces of the file deletion history information whose checked deletion number has a T-score larger than a predetermined value and whose deletion method classification 134 indicates 'erase file'. Next, the injustice detecting unit 140 detects the injustice concealing operation on the basis of a judgment whether the ratio of the counted number is larger than a predetermined value or not.

Moreover, for example, the following may be used by combining the first specific example and the third specific example. The injustice detecting unit 140 selects only the file deletion history information, whose deletion method classification 134 indicates 'erase file', as objects and calculates a T-score of the checked deletion number of the objects.

Moreover, for example, the following may be used by combining the first specific example and the fourth specific example. The injustice detecting unit 140 selects only the file deletion history information, whose deleted file generation time 135 indicates that the deleted file is generated before a predetermined time, as objects and calculates a T-score of the checked deletion number of the objects.

Moreover, for example, the following may be used by combining the fifth specific example and the fourth specific example. The injustice detecting unit 140 selects only the file deletion history information, whose deleted file generation time 135 indicates that the deleted file is generated before a predetermined time, as objects, and calculates a T-score of the total of the checked deletion numbers of the objects.

Moreover, for example, the following may be used by combining the first specific example and the sixth specific example. The injustice detecting unit 140 generates a normal distribution related to the number of kinds of cooperative deletion which is calculated on the basis of the pre-disclosure operation history information. Then, the injustice detecting unit 140 calculates a T-score of the number of kinds of cooperative deletion, which is calculated on the basis of the post-disclosure operation history information, according to the normal distribution.

Moreover, for example, in the third to the sixth specific examples, the injustice detecting unit 140 may correspond to 'audit information including at least a scheduled time information, which indicates a scheduled time for executing the audit, in addition to audit execution information', similarly to a relation of the second specific example with the first specific example.

Moreover, in addition to the specific example mentioned above, for example, file deletion history information may include a distinction between a file deletion carried out by an user's instruction and a file deletion carried out automatically by a system or an application. The file deletion carried out by the user's instruction is corresponding to, for example, moving a file to a trash box by drag-and-drop with handling a mouse, and deleting a file by selecting 'deletion' from the menu bar. Then, the injustice detecting unit 140 may select the file deletion history information, which indicates deletion carried out by the user's instruction, as an object, and may detect the injustice concealing operation out of the object.

The above is the description of the specific example of the operation of the injustice detecting unit 140.

The audit information displaying unit 181 of the monitored device 180 makes a display means of the monitored device 180, which is not shown in the figure, display the audit information on the basis of the received audit information.

In the case that the history acquiring unit 182, which monitors an operation carried out by the control unit 183, detects any one of one or more than one predetermined operations (for example, file deletion), the history acquiring unit 182 acquires and outputs the operation history information 131 related to the detected operation.

Here, the history acquiring unit 182 may acquire the deleted file contents 137 out of the operation history information 131 only in a period of time from a time when the audit information displaying unit 181 displays the audit information until a time when a predetermined predicted period of time elapses, and output the acquired deleted file contents 137. Here, the history acquiring unit 182 may acquire a period of time which means that it is predicted that, during the period of time, the injustice concealing operation is carried out at a trigger time when the audit information is disclosed as mentioned above. Then, the history acquiring unit 182 may use the period of time as the predicted period of time.

The history acquiring unit 182 detects the operation of deleting the file, for example, by monitoring that the control unit 183, which will be described later, calls API (Application Programming Interface) for deleting the file. Since the technique related to detecting the operation is well known, detailed description is omitted.

The control unit 183 controls an original operation of the monitored device 180. For example, in the case that the monitored device 180 is a server, a personal computer, or a terminal, the control unit 183 controls an operation which is carried out as the server, the personal computer, or the terminal respectively.

Next, an operation according to the exemplary embodiment will be described in detail with reference to a drawing.

First, an operation of disclosing audit information and an operation of detecting injustice concealing operations will be described.

Figure 3:
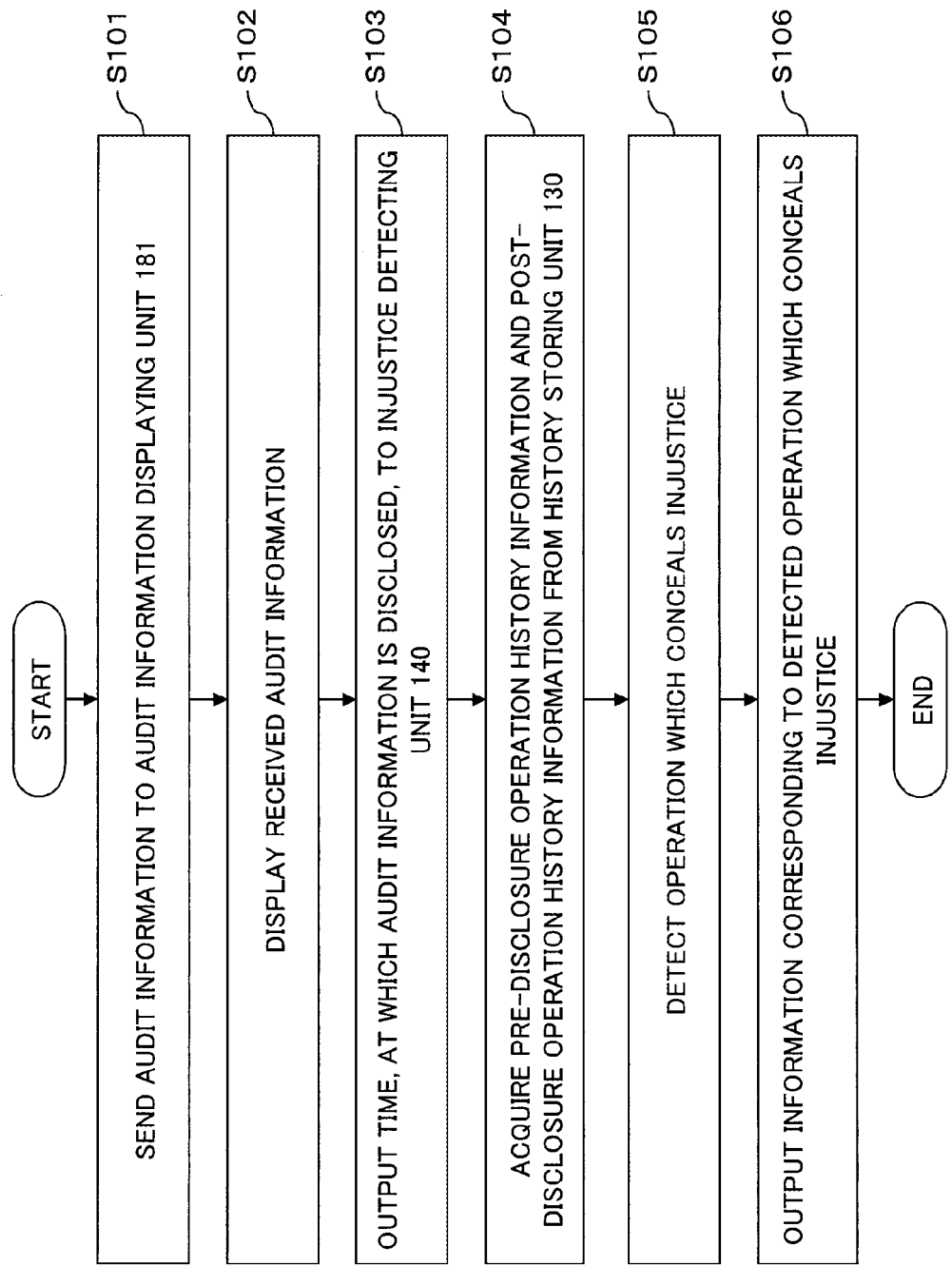
FIG. 3 is a flowchart showing an operation of disclosing audit information, and an operation of detecting a handling for concealing an injustice in the first exemplary embodiment of the present invention.

FIG. 3 is a flowchart showing an operation of disclosing audit information and an operation of detecting injustice concealing operations according to the exemplary embodiment.

The audit information disclosing unit 120 of the injustice detecting device 110 sends audit information to the audit information displaying unit 181 of the monitored device 180 (Step S101).

Next, the audit information displaying unit 181 displays the received audit information (Step S102).

Next, the audit information disclosing unit 120 outputs a audit information disclosure time (time when the audit information is sent to the audit information displaying unit 181 of the monitored device 180) to the injustice detecting unit 140 after a predetermined time elapses (Step S103).

Next, the injustice detecting unit 140 acquires pre-disclosure operation history information and post-disclosure operation history information from the history storing unit 130 on the basis of the received audit information disclosure time (Step S104).

Next, the injustice detecting unit 140 detects an injustice concealing operation on the basis of the acquired pre-disclosure operation history information and the acquired post-disclosure operation history information (Step S105).

Next, in the case that the injustice detecting unit 140 detects the injustice (the injustice concealing operation), the injustice detecting unit 140 outputs information corresponding to the detected injustice concealing operation, that is, information related to the injustice (Step S106).

Next, an operation of acquiring the operation history information 131 and an operation of storing the acquired operation history information 131 will be described.

Figure 4:
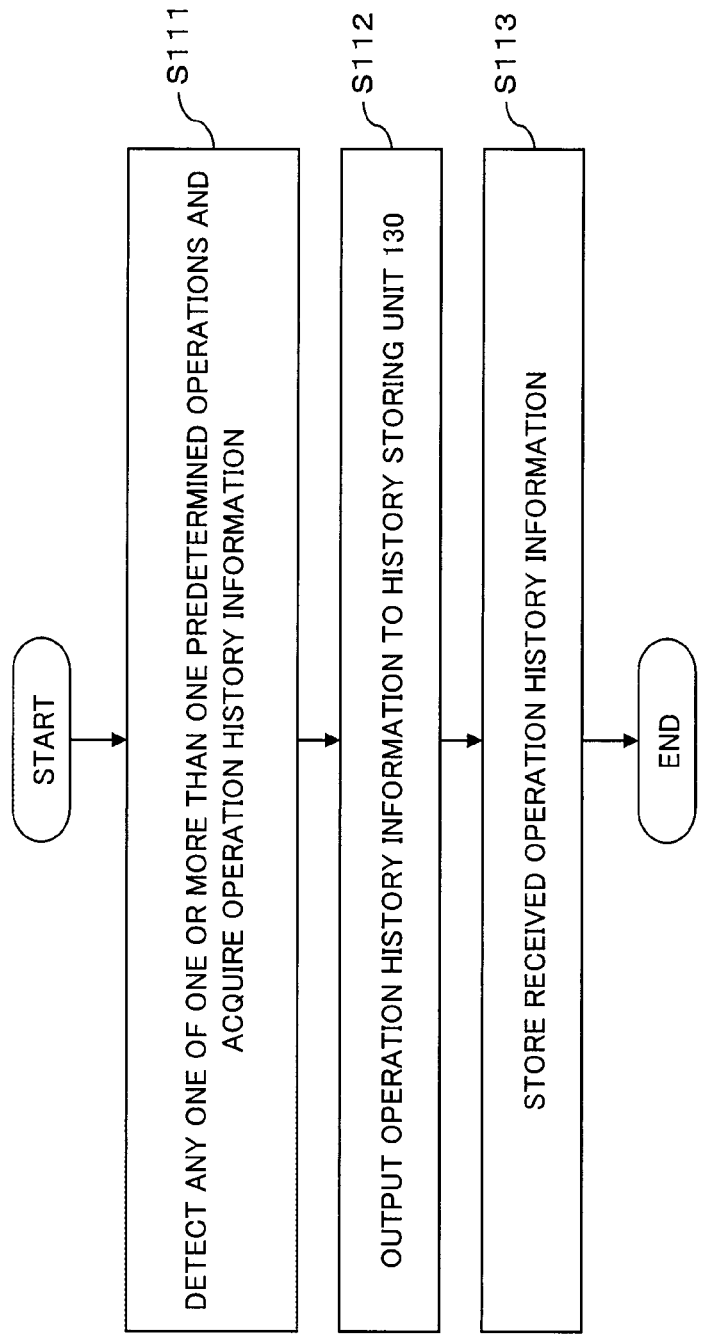
FIG. 4 is a flowchart showing an operation of acquiring the operation history information and an operation of storing the acquired operation history information in the first exemplary embodiment of the present invention.

FIG. 4 is a flowchart showing the operation of acquiring the operation history information 131 and the operation of storing the acquired operation history information 131 according to the exemplary embodiment.

In the case that the history acquiring unit 182 of the monitored device 180, which monitor an operation carried out by the control unit 183, detects any one of one or more than one predetermined operations, the history acquiring unit 182 acquires the operation history information 131 related to the detected operation (Step S111).

Next, the history acquiring unit 182 outputs the acquired operation history information 131 to the history storing unit 130 of the injustice detecting device 110 (Step S11).

Next, the history storing unit 130 stores the received operation history information 131 (Step S113).

Next, a first specific example of an operation of the injustice detecting unit 140 will be described.

Figure 5:
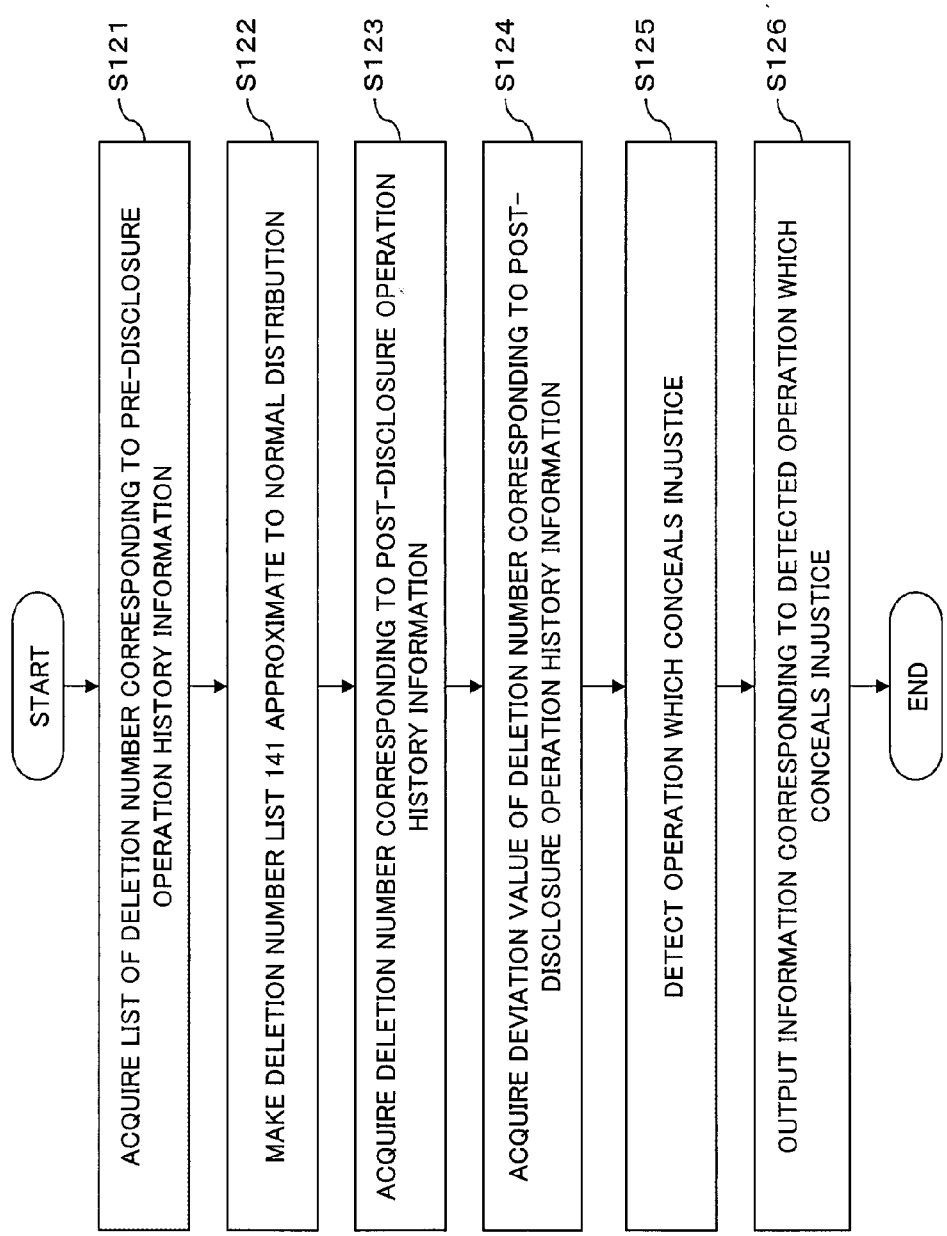
FIG. 5 is a flowchart showing details of an operation of searching for the handling for concealing the injustice in the first exemplary embodiment of the present invention.

FIG. 5 is a flowchart showing a detailed operation of searching for the injustice concealing operation (corresponding to Step S104 and Step S105 in FIG. 3) according to the exemplary embodiment.

The injustice detecting unit 140 refers to the history storing unit 130 and acquires a list of deletion number corresponding to pre-disclosure operation history information (Step S121).

Figure 6:
FIG. 6 is a diagram showing an example of a deletion list in the first exemplary embodiment of the present invention.

FIG. 6 is a diagram showing an example of the list of the deletion number which the injustice detecting unit 140 acquires. Referring to FIG. 6, a deletion number list 141 includes a plurality of the usual deletion numbers 142 per an unit time which are corresponding to the pre-disclosure operation history information.

Next, the injustice detecting unit 140 makes the usual deletion number 142, which is included in the deletion number list 141, approximate to the normal distribution (Step S122). The example in FIG. 6 shows the normal distribution whose average (mu) is '1.36', and whose deviation (rho times rho) is '0.60'.

Next, the injustice detecting unit 140 refers to the history storing unit 130, and acquires a checked deletion number (for example, assumed to be 5) corresponding to post-disclosure operation history information (Step S123). Here, the checked deletion number, which the injustice detecting unit 140 acquires, is the maximum checked deletion number out of plural checked deletion numbers per the unit time which are corresponding to the post-disclosure operation history information. Moreover, as the checked deletion number, the injustice detecting element 140 may acquire an average value of the plural checked deletion numbers per the unit time which are corresponding to the post-disclosure operation history information.

Next, the injustice detecting unit 140 acquires the T-score of the checked deletion number '5' according to the normal distribution related to the usual deletion number 142 (Step S124). In the case of the example shown in FIG. 6, the T-score is '75.59'.

Next, the injustice detecting unit 140 detects the injustice concealing operation on the basis of a judgment whether the calculated T-score is larger than a predetermined value (for example, 70) (Step S125).

Next, the injustice detecting unit 140 outputs information related to the detected injustice concealing operation (for example, the deleted file name 136 and the deleted file contents 137 which are included in the post-disclosure operation history information whose operation contents 132 indicates 'erase file') (Step S126).

While it is described to delete the file in the above-mentioned exemplary embodiment, to count rewriting the file may be used instead of deleting the file. Moreover, to count both of deleting the file and rewriting the file may be used.

While the operation of detecting the injustice is described with exemplifying deletion of the file and rewriting of the file which are handled by OS (Operating System) in the above-mentioned exemplary embodiment, the injustice may be detected by carrying out the above-mentioned operation to deletion of an e-mail which is handled by electronic mail software.

A first effect in the exemplary embodiment mentioned above exists in a point that it is possible to detect the injustice carried out by the operation which can not be distinguished from the normal operation.

The reason is that the exemplary embodiment includes the following configuration. That is, firstly, the audit information disclosing unit 120 discloses the audit information. Secondly, on the basis of the pre-disclosure operation history information and the post-disclosure operation history information with reference to the history storing unit 130, the injustice detecting unit 140 detects the injustice concealing operation, that is, the operation which indicates that the injustice is carried out previously.

A second effect in the exemplary embodiment mentioned above exists in a point that it is possible to make it unnecessary to prepare a specific rule (for example, the whitelist and the blacklist) which is used for specifying the injustice.

The reason is the same as one of the first effect.

A third effect in the exemplary embodiment mentioned above exists in a point that it is possible to acquire efficiently the appropriate operation history information 131 which is used for detecting the injustice concealing operation.

The reason is that the audit information includes the scheduled time information, and the injustice detecting unit 140 uses the post-disclosure pre-execution operation history information as the post-disclosure operation history information.

A fourth effect in the exemplary embodiment mentioned above exists in a point that it is possible to execute the audit efficiently.

The reason is that the file deletion history information, which is included in the post-disclosure operation history information stored in the history storing unit 130, includes the contents of the deleted file.

A fifth effect in the exemplary embodiment mentioned above exists in a point that it is possible to record the contents of the deleted file efficiently and to save a capacity of the history storing unit 130.

The reason is that the history acquiring unit 182 acquires the deleted file contents 137 out of the operation history information 131 only in the period of time from the time when the audit information displaying unit 181 displays the audit information until the time when the predetermined predicted period of time elapses, and outputs the acquired deleted file contents 137.

A sixth effect in the exemplary embodiment mentioned above exists in a point that it is possible to detect the injustice which is carried out by a plurality of injustice persons in conspiracy.

The reason is that the injustice detecting unit 140 detects the injustice concealing operation on the basis of the total of the usual deletion numbers and the total of the checked deletion numbers of the plural monitored devices 180.

A seventh effect in the exemplary embodiment mentioned above exists in a point that it is possible to improve accuracy more in detecting the injustice.

The reason is that the file deletion history information includes information which indicates whether the file deletion is carried out by the user's instruction or not, and the injustice detecting unit 140 selects the file deletion history information, which indicates that the file deletion is carried out by the user's instruction, as objects, and detects the injustice concealing operation in the objects.

Second Exemplary Embodiment

Next, a second exemplary embodiment of the present invention will be described in detail with reference to a drawing. Hereinafter, description contents, which overlap with the above-mentioned description contents, are omitted in a range where description of the exemplary embodiment does not become unclear.

The second exemplary embodiment according to the present invention is different from the first exemplary embodiment in the operations of the audit information disclosing unit 120 and the history acquiring unit 182.

The audit information disclosing unit 120 according to the exemplary embodiment instructs the history acquiring unit 182 of the monitored 180 to start and to stop acquisition of the operation history information 131.

For example, the audit information disclosing unit 120 outputs an acquisition start time and an acquisition stop time to the history acquiring unit 182. Moreover, for example, the audit information disclosing unit 120 may output an instruction, which indicates to start acquisition, at the acquisition start time to the history acquiring unit 182, and may output an instruction, which indicates to stop acquisition, at the acquisition stop time to the history acquiring unit 182.

Here, the audit information disclosing unit 120 determines the acquisition start time and the acquisition stop time, for example, on the basis of the predetermined period of time when the operation history information 131 is acquired before disclosure of audit information, and a time when the audit information is disclosed. The acquisition start time and the acquisition stop time mean a start time and a stop time of the period of time when the operation history information 131 is acquired before disclosure of the audit information respectively.

Moreover, the audit information disclosing unit 120 determines the acquisition start time and the acquisition stop time, for example, on the basis of the predetermined period of time when the operation history information 131 is acquired after disclosure of audit information, and a time when the audit information is disclosed. The acquisition start time and the acquisition stop time mean a start time and a stop time of the period of time when the operation history information 131 is acquired after disclosure of the audit information.

Moreover, the audit information disclosing unit 120 determines the acquisition start time and the acquisition stop time, for example, on the basis of the predetermined period of time when the operation history information 131 is acquired after disclosure of audit information, scheduled time information included in the audit information, and a time when the audit information is disclosed. The acquisition start time and the acquisition stop time mean a start time and a stop time of a period of time from the time when the audit information is disclosed until the time indicated by the scheduled time information respectively.

The history acquiring unit 182 acquires the operation history information 131 on the basis of the instructions to start and to stop acquisition of the operation history information 131 which are issued by the audit information disclosing unit 120.

A first effect in the exemplary embodiment mentioned above, which includes the effect of the first exemplary embodiment, exists furthermore in a point that it is possible to prevent an erroneous detection.

The reason is that the audit information disclosing unit 120 instructs the history acquiring unit 182 to start and to stop acquisition of the operation history information 131, and the history acquiring unit 182 acquires the operation history only in a required period of time on the basis of the instructions.

A second effect in the exemplary embodiment mentioned above exists in a point that it is possible to make a load of the monitored device 180 light.

The reason is the same as one of the first effect.

Third Exemplary Embodiment

Next, a third exemplary embodiment of the present invention will be described in detail with reference to a drawing. Hereinafter, description contents, which overlap with the above-mentioned description contents, are omitted in a range where description of the exemplary embodiment does not become unclear.

The third exemplary embodiment of the present invention is different from the first exemplary embodiment in the operation of the injustice detecting unit 140. Moreover, the exemplary embodiment is different from the first exemplary embodiment in operation history information which the history string unit 130 stores.

FIG. 7 is a diagram showing an example of operation history information 331 in the exemplary embodiment. Referring to FIG. 7, the operation history information 131 includes at least the operation contents 132, the operation time 133, an address 334 and communication data contents 337.

The address 334 is an address of the other party of communication. For example, in the case that the operation contents 132 indicates 'receive mail' or 'send mail', the address 334 means a mail address of the other party who sends or receives the mail respectively. Moreover, for example, in the case that the operation contents 132 indicate 'browse web', the address 334 means an address of a web page indicated by URL (Uniform Resource Locator).

The communication data contents 337 means data contents of communication with the other party indicated by the address 334. The communication data contents 337 may include all of or a part of the data contents of the communication. For example, in the case that the operation contents 132 indicate 'receive mail' or 'send mail', the communication data contents 337 mean header information, a main body data or an attached file of the mail which is sent or received respectively. Moreover, for example, in the case that the operation contents 132 indicate 'browse web', the communication data contents 337 means received display data (for example, hypertext) and sent input data (for example, form data).

The injustice detecting unit 140 according to the exemplary embodiment detects injustice on the basis of pre-disclosure operation history information and post-disclosure operation history information like the injustice detecting unit 140 according to the first exemplary embodiment. Here, the injustice detecting unit 140 according to the exemplary embodiment detects an injustice which is carried out previously as a result of detecting that operation, which carries out an injustice, is not carried out any more.

Next, in the case that the injustice detecting unit 140 detects the injustice (detect that the operation which carries out the injustice is not carried out any more), the injustice detecting unit 140 outputs information corresponding to the operation which is not carried out any more, that is, information related to the injustice to an outside by use of a means which is not shown in the figure.

Next, a specific example of the operation of the injustice detecting unit 140 according to the exemplary embodiment will be described.

For example, on the basis of the address 334 of the operation history information 331 which is included in each of pre-disclosure operation history information and post-disclosure operation history information and which includes the specific operation contents 132 (for example, 'send mail'), the injustice detecting unit 140 detects that the operation which carries out an injustice is not carried out any more.

As a more specific example, the injustice detecting unit 140 counts number of pieces of the operation history information 331 which is included in the pre-disclosure operation history information and is not included in the post-disclosure operation history information and which includes specific operation contents 332 and the specific address 334.

Next, on the basis of a judgment whether the counted number of the pieces of the operation history information 331 is larger than a predetermined value (for example, 3) or not, the injustice detecting unit 140 detects that the operation which carries out the injustice is not carried out any more. That is, in the case that the counted number of the pieces of the operation history information 331 is larger than the predetermined value, the injustice detecting unit 140 detects the operation history information 331 as the history of the injustice operation which is carried out previously.

In this case, the operation history information may include only the operation contents 132, the operation time 133 and the address 334 out of the operation history information 331.

In the case that the operation contents 132 indicate 'receive mail' or 'browse web', an operation of the injustice detecting unit 140 according to the exemplary embodiment mentioned above is similar to the operation which is carried out in the case of 'send mail'.

An effect in the exemplary embodiment mentioned above, which includes the effect according to the first exemplary embodiment, exists furthermore in a point that it is possible to detect that an injustice is carried out even in the case that an active operation (for example, injustice concealing operation) is not carried out.

The reason is that, on the basis of the pre-disclosure operation history information and the post-disclosure operation history information, the injustice detecting unit 140 can detect that a specific operation is not carried out any more.

Fourth Exemplary Embodiment

Next, a fourth exemplary embodiment of the present invention will be described in detail with reference to a drawing. Hereinafter, description contents, which overlap with the above-mentioned description contents, are omitted in a range where description of the exemplary embodiment does not become unclear.

Figure 8:
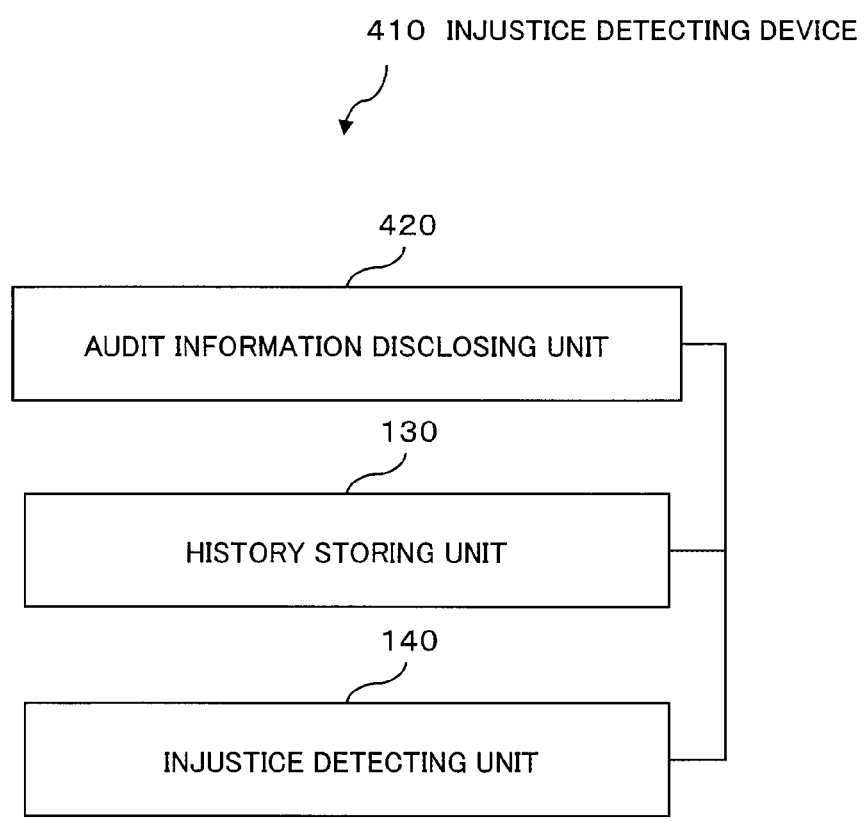
FIG. 8 is a block diagram showing a configuration according to a fourth exemplary embodiment of the present invention.

FIG. 8 is a block diagram showing a configuration according to the exemplary embodiment. Referring to FIG. 8, an injustice detecting device 410 according to the exemplary embodiment includes an audit information disclosing unit 420, the history storing unit 130 and the injustice detecting unit 140.

The audit information disclosing unit 420 is different from the audit information disclosing unit 120 according to the first exemplary embodiment in a point of notifying an outside of audit information by use of a mail or the like. The audit information disclosing unit 420 may make, for example, a display unit (not shown in the figure) display the audit information.

Similarly to the effect in the first exemplary embodiment, an effect in the exemplary embodiment mentioned above exists in a point that it is possible to detect an injustice carried out by the operation which can not be distinguished from the normal operation.

The reason is that the audit information disclosing unit 420 discloses the audit information, and the injustice detecting unit 140 detects the injustice with reference to the history storing unit 130 on the basis of the pre-disclosure operation history information and the post-disclosure operation history information.

Fifth Exemplary Embodiment

Next, a fifth exemplary embodiment according to the present invention will be described in detail with reference to a drawing. Hereinafter, description contents, which overlap with the above-mentioned description contents, are omitted in a range where description of the exemplary embodiment does not become unclear.

The fifth exemplary embodiment according to the present invention is corresponding to an exemplary embodiment which makes a computer execute a predetermined process according to the fourth exemplary embodiment by use of a program.

Figure 9:
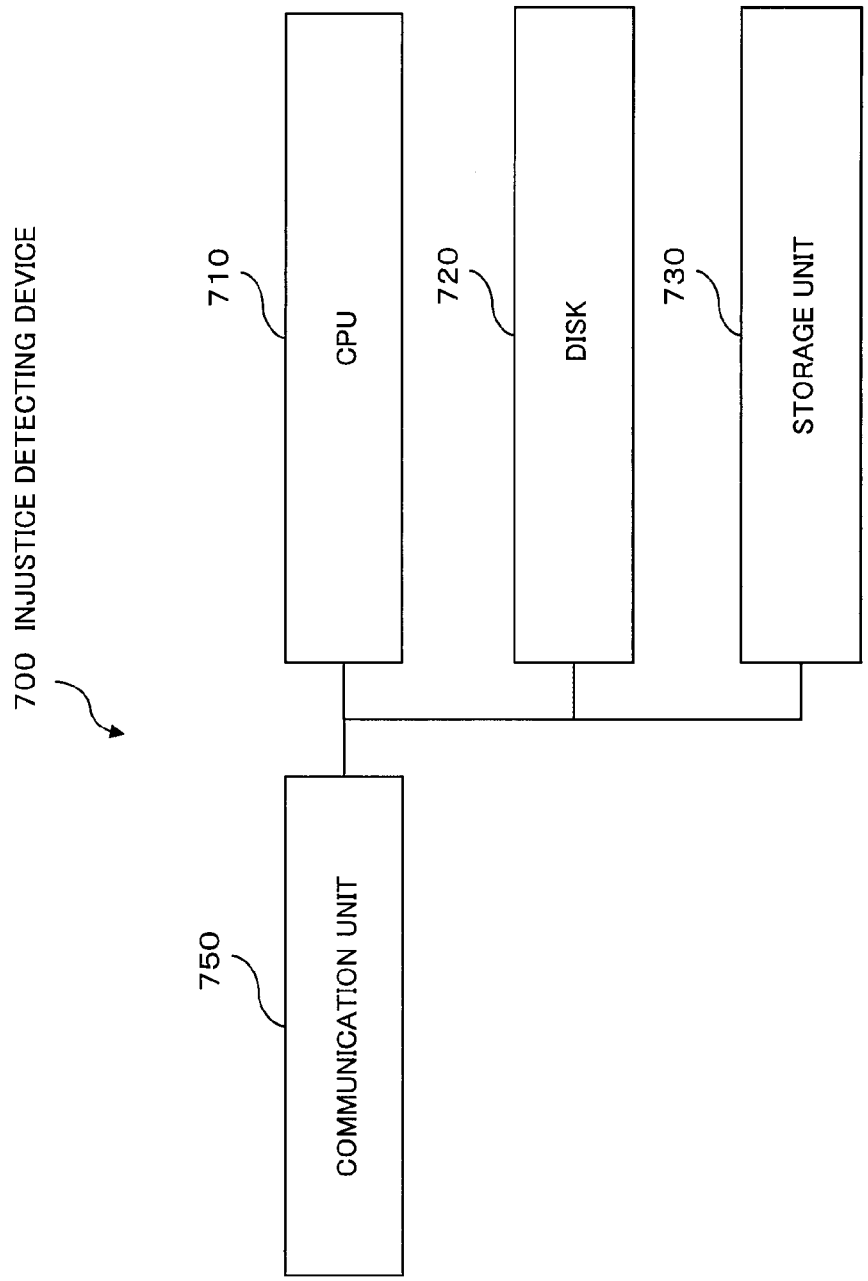
FIG. 9 is a block diagram showing a configuration according to a fifth exemplary embodiment of the present invention.

FIG. 9 is a block diagram showing a configuration of an injustice detecting device 700 according to the exemplary embodiment. Referring to FIG. 9, the injustice detecting device 700 according to the exemplary embodiment includes CPU (Central Processing Unit) 710, a disk 720, a storage unit 730 and a communication unit 750. That is, the injustice detecting device 700 is a computer.

Similarly, the injustice detecting device according to the first to the third exemplary embodiments may be the injustice detecting device 700 which includes a general-purpose computer as shown in FIG. 9.

Figure 11:
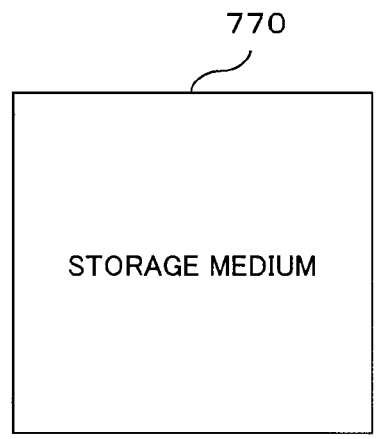
FIG. 11 is a diagram showing a recording medium which records a program according to the present invention.

FIG. 11 is a diagram showing a recording medium (or storage medium) 770 which records the program. The recording medium 770 is a non-transitory recording medium which stores information non-temporarily. Here, the recording medium 770 may be a recording medium which stores information temporarily.

The injustice detecting device 700 may include the recording medium 770 supplied from an outside.

The audit information disclosing unit 420 and the injustice detecting unit 140 of the injustice detecting device 410 shown in FIG. 8 are corresponding to CPU 710, the disk 720 and the storage unit 730. Moreover, the history storing unit 130 of the injustice detecting device 410 is corresponding to the storage unit 730.

CPU 710 makes an operating system (not shown in the figure) work to control a whole operation of the injustice detecting device 700. Moreover, CPU 710 reads a program (for example, program to make the injustice detecting device 700 carry out the operation of the injustice detecting device which is defined by the flowcharts shown in FIGS. 3 to 5) and data, for example, from the recording medium 770 mounted on the disk 720. Then, CPU 710 makes the read program and data stored in the storage unit 730. Then, CPU 710 executes various processes as the audit information disclosing unit 420 and the injustice detecting unit 140 shown in FIG. 8 according to the read program and on the basis of the read data. Similarly, CPU 710 executes various processes as the audit information disclosing unit 120 and the injustice detecting unit 140 shown in FIG. 1.

Here, CPU 710 may download the program and the data into the storage unit 730 from an external computer (not shown in the figure) which is connected with a communication network (not shown in the figure).

CPU 710 transfers the program which is stored in the disk 720, for example, to the storage unit 730, and executes the same process as the audit information disclosing unit 420 and the injustice detecting unit 140 carry out, on the basis of the transferred program.

The disk 720 stores the program.

The disk 720 may be, for example, an optical disk, a flexible disk, a magnetic optical disk, an external hard disk and a semiconductor memory, and may include the recording medium 770. The disk 720 records the program so that the program may be computer-readable. Moreover, the disk 720 may record data so that the data may be computer-readable. The disk 720 may include the history storing unit 130.

The storage unit 730 stores the transferred program. Moreover, the storage unit 730 stores the operation history information 131 like the history storing unit 130.

The communication unit 750 is included in each of the audit information disclosing unit 420 and the injustice detecting unit 140.

As described above, function blocks of the injustice detecting device 110 shown in FIG. 1 and the injustice detecting device 410 shown in FIG. 8 are realized by the injustice detection device 700 which has a hardware configuration shown in FIG. 9. However, a means to realize each unit of the injustice detecting device 700 is not limited to the above. That is, the injustice detecting device 700 may be realized by one device which has a configuration combined physically or may be realized by a plurality of devices which are separated physically each other and are connected each other through a wire line or a wireless line.

Here, the recording medium 770 which records a code of the above-mentioned program may be supplied to the injustice detecting device 700, and CPU 710 may read the code of the program, which is stored in the recording medium 770, and carry out the program. Or, CPU 710 may store the code of the program, which is stored in the recording medium 770, in the storage unit 730 and/or the disk 720. That is, the present exemplary embodiment includes an exemplary embodiment of the recording medium 770 which stores temporarily or non-temporarily the program (software) executed by the injustice detecting device 700 (CPU 710).

An effect in the exemplary embodiment mentioned above is the same as one in the first to the fourth exemplary embodiments.

The reason is that the general-purpose computer executes the same process as each element of each exemplary embodiment carries out.

Here, it is described in each exemplary embodiment mentioned above that the monitored device 180 is, for example, the server, PC, the terminal or another information processing device. However, the monitored device 180 may be a management device for entering and leaving a room or a facility management device. These devices may detect the injustice on the basis of the pre-disclosure operation history information and the post-disclosure operation history information as described in each exemplary embodiment.

Figure 10:
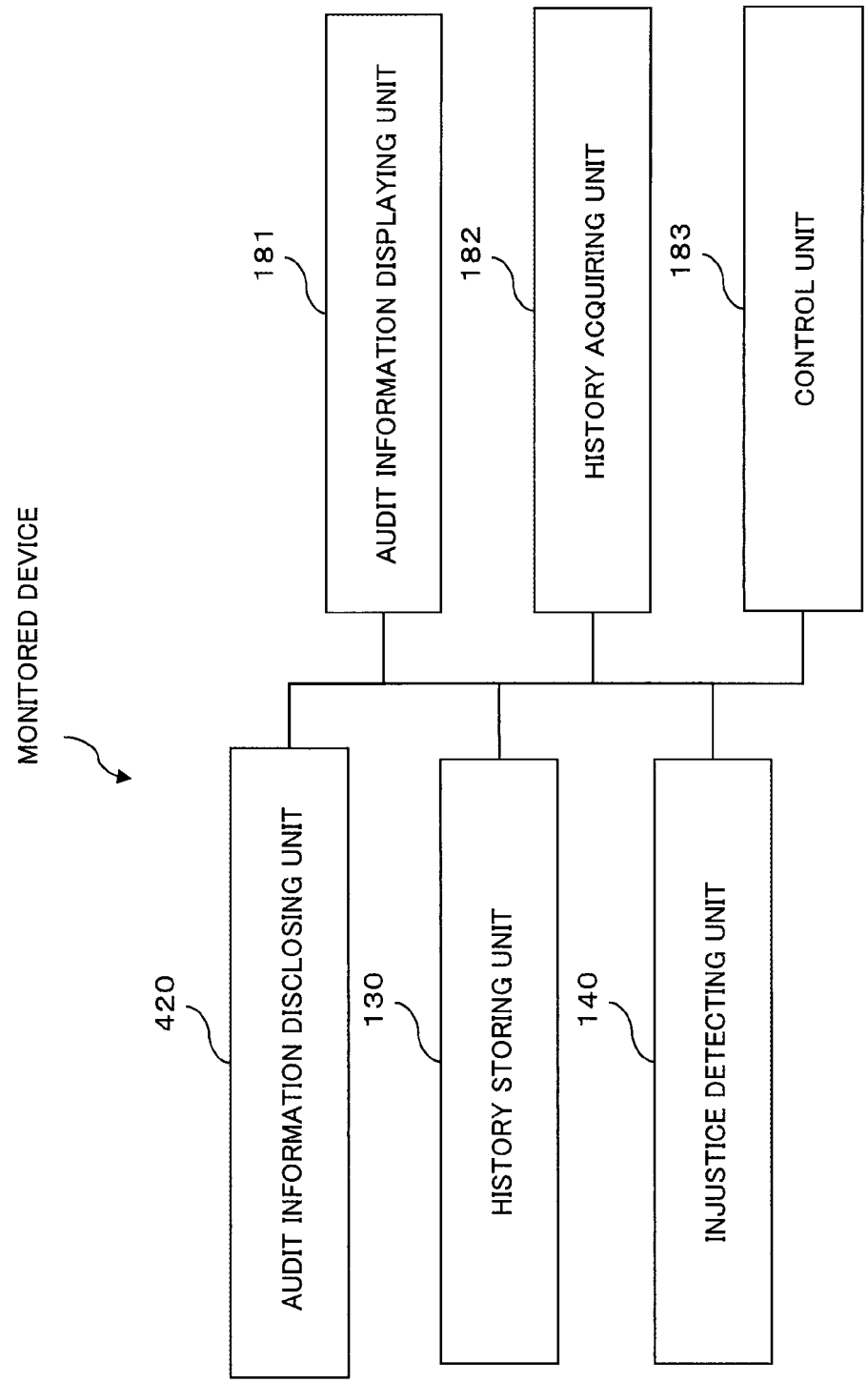
FIG. 10 is a block diagram showing an example of a monitored device which includes an injustice detecting device according to the present invention.

The injustice detecting device according to each exemplary embodiment mentioned above may be mounted on the monitored device or may be included in the monitored device. FIG. 10 is a block diagram showing an example of the monitored device including the injustice detecting device.

While the invention of the present application has been described with reference to the exemplary embodiment as mentioned above, the invention of the present application is not limited to the above-mentioned exemplary embodiment. Various changes, which a person skilled in the art can understand, can be added to the composition and the detail of the invention of the present application in the scope of the present invention.

This application is based upon and claims the benefit of priority from Japanese Patent Application No. 2011-107300 filed on May 12, 2011, the disclosure of which is incorporated in its entirety by reference.

DESCRIPTION OF THE REFERENCE NUMERALS

110 injustice detecting device
120 audit information disclosing unit
130 history storing unit
131 operation history information
132 operation contents
133 operation time
134 deletion method classification
135 deleted file generation time
136 deleted file name
137 deleted file contents
140 injustice detecting unit
141 deletion number list
142 usual deletion number
180 monitored device
181 audit information displaying unit
182 history acquiring unit
183 control unit
331 operation history information
332 operation contents
334 address
337 communication data contents
410 injustice detecting device
420 audit information disclosing unit
700 injustice detecting device
710 CPU
720 Disk
730 storage unit
750 communication unit
770 recording medium

The invention claimed is:

1. An injustice detecting system, comprising:
a memory which stores operation history information of a monitored device;
an audit information disclosing-unit which discloses audit information including at least information which indicates that an audit will be conducted for detecting one or more compliance violations which have been committed in the past; and
an injustice detecting unit which detects an abnormal operation or an operation pattern change which is carried out after disclosing the audit information on the basis of pre-disclosure operation history information corresponding to said operation history information before a point in time when said audit information is disclosed, and post-disclosure operation history information corresponding to said operation history information after the point in time.

2. The injustice detecting system according to claim 1, wherein
said monitored device includes furthermore a history acquiring unit which acquires said operation history information, and wherein
said audit information disclosing unit instructs said history acquiring unit to start acquiring said operation history information and to stop acquiring said operation history information.

3. The injustice detecting system according to claim 1, wherein
said audit information includes furthermore scheduled time information which indicates a scheduled time when an audit is executed, and wherein
said injustice detecting unit detects said abnormal operation or operation pattern change on the basis of said pre-disclosure operation history information and post-disclosure pre-execution operation history information corresponding to said operation history information, in a period of time from a time when said audit information is disclosed until said scheduled time indicated by said scheduled time information, out of said post-disclosure operation history information.

4. The injustice detecting system according to claim 1, wherein
said injustice detecting unit detects said abnormal operation or operation pattern change on the basis of number of pieces of file deletion history information which is included in each of said pre-disclosure operation history information and said post-disclosure operation history information and which indicates histories of file deleting operations.

5. The injustice detecting system according to claim 1, characterized in that:
said injustice detecting unit detects said abnormal operation or operation pattern change on the basis of information which is included in said file deletion history information and which indicates classification of a file deleting method.

6. The injustice detecting system according to claim 1, wherein
said injustice detecting unit detects said abnormal operation or operation pattern change on the basis of information which is included in said file deletion history information and which indicates generation date and time of a deleted file.

7. The injustice detecting system according to claim 1, characterized in that:
said injustice detecting unit detects said abnormal operation or operation pattern change on the basis of said file deletion history information of a plurality of said monitored devices.

8. The injustice detecting system according to claim 4, wherein
said file deletion history information, which is included in said post-disclosure operation history information, includes contents of a deleted file.

9. The injustice detecting system according to claim 1, wherein
said injustice detecting unit detects said abnormal operation or operation pattern change on the basis of address information of the other party of a communication which is included in each of said pre-disclosure operation history information and said post-disclosure operation history information.

10. An injustice detecting device, comprising:
a memory which stores operation history information of a monitored device;
an audit information disclosing unit which discloses audit information including at least information which indicates that an audit will be conducted for detecting compliance violations which have been committed in the past; and
an injustice detecting unit which detects an abnormal operation or operation pattern change which is carried out after disclosing the audit information on the basis of pre-disclosure operation history information corresponding to said operation history information before a point in time when said audit information is disclosed, and post-disclosure operation history information corresponding to said operation history information after the point in time.

11. The injustice detecting device according to claim 10, further comprising:
a history acquiring unit which acquires said operation history information.

12. An injustice detecting method which an injustice detecting device executes, comprising:
storing operation history information of a monitored device;
disclosing audit information including at least information which indicates that an audit will be conducted for detecting compliance violations which have been committed in the past; and
detecting an abnormal operation or operation pattern change which is carried out after disclosing the audit information on the basis of pre-disclosure operation history information corresponding to said operation history information before a point in time when said audit information is disclosed, and post-disclosure operation history information corresponding to said operation history information after the point in time.

13. The injustice detecting method according to claim 12, further comprising:
instructing said monitored device which acquires said operation history information to start acquiring said operation history information and to stop acquiring said operation history information.

14. A non-transitory computer-readable recording medium recording a program for making a computer, which includes a memory to store operation history information of a monitored device, execute a process comprising:
disclosing audit information including at least information which indicates that an audit will be conducted for detecting compliance violations which have been committed in the past; and
detecting an abnormal operation or an operation pattern change which is carried out after disclosing the audit information on the basis of pre-disclosure operation history information corresponding to said operation history information before a point in time when said audit information is disclosed and post-disclosure operation history information corresponding to said operation history information after the point in time when said audit information is disclosed.

15. An injustice detecting system, comprising:
a memory for storing operation history information of a monitored device;
an audit information disclosing means for disclosing audit information including at least information which indicates that an audit will be conducted for detecting compliance violations which have been committed in the past; and an injustice detecting means for detecting an abnormal operation or an operation pattern change which is carried out after disclosing the audit information on the basis of pre-disclosure operation history information corresponding to said operation history information before a point in time when said audit information is disclosed and post-disclosure operation history information corresponding to said operation history information after the point in time when said audit information is disclosed.

\* \* \* \* \*